INVENTOR.
RICHARD H. MELVIN
BY
ATTORNEYS

Oct. 5, 1965  R. H. MELVIN  3,209,922
MATERIAL HANDLING APPARATUS
Filed May 16, 1962  4 Sheets-Sheet 2
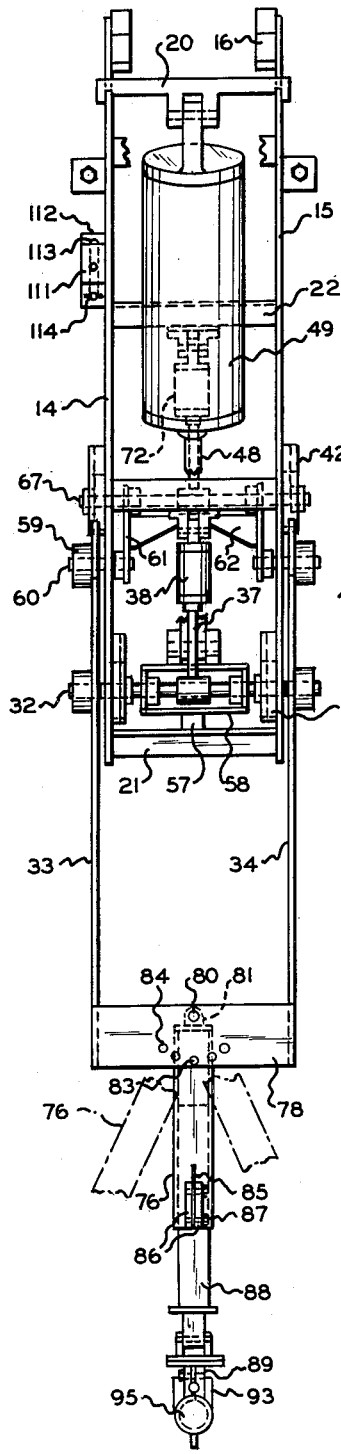
FIG. 2
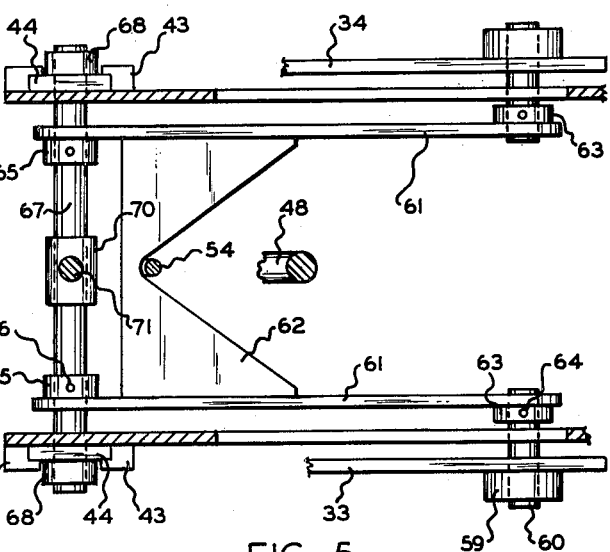
FIG. 5
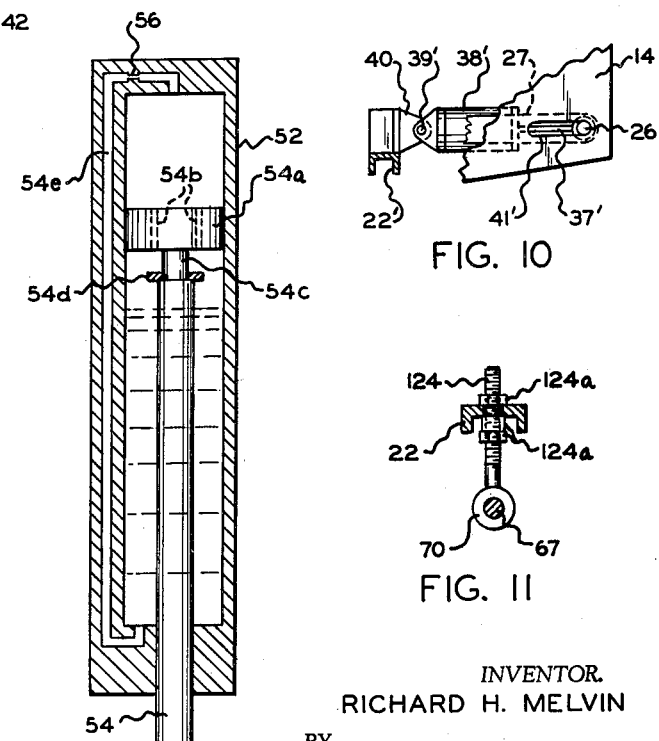
FIG. 6
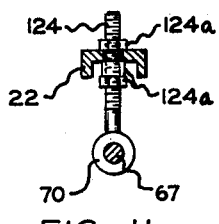
FIG. 10
FIG. 11
INVENTOR.
RICHARD H. MELVIN
BY
*Jearman, Jearman, & McCulloch*
ATTORNEYS Oct. 5, 1965   R. H. MELVIN   3,209,922
MATERIAL HANDLING APPARATUS
Filed May 16, 1962   4 Sheets-Sheet 3

INVENTOR.
RICHARD H. MELVIN
BY
ATTORNEYS

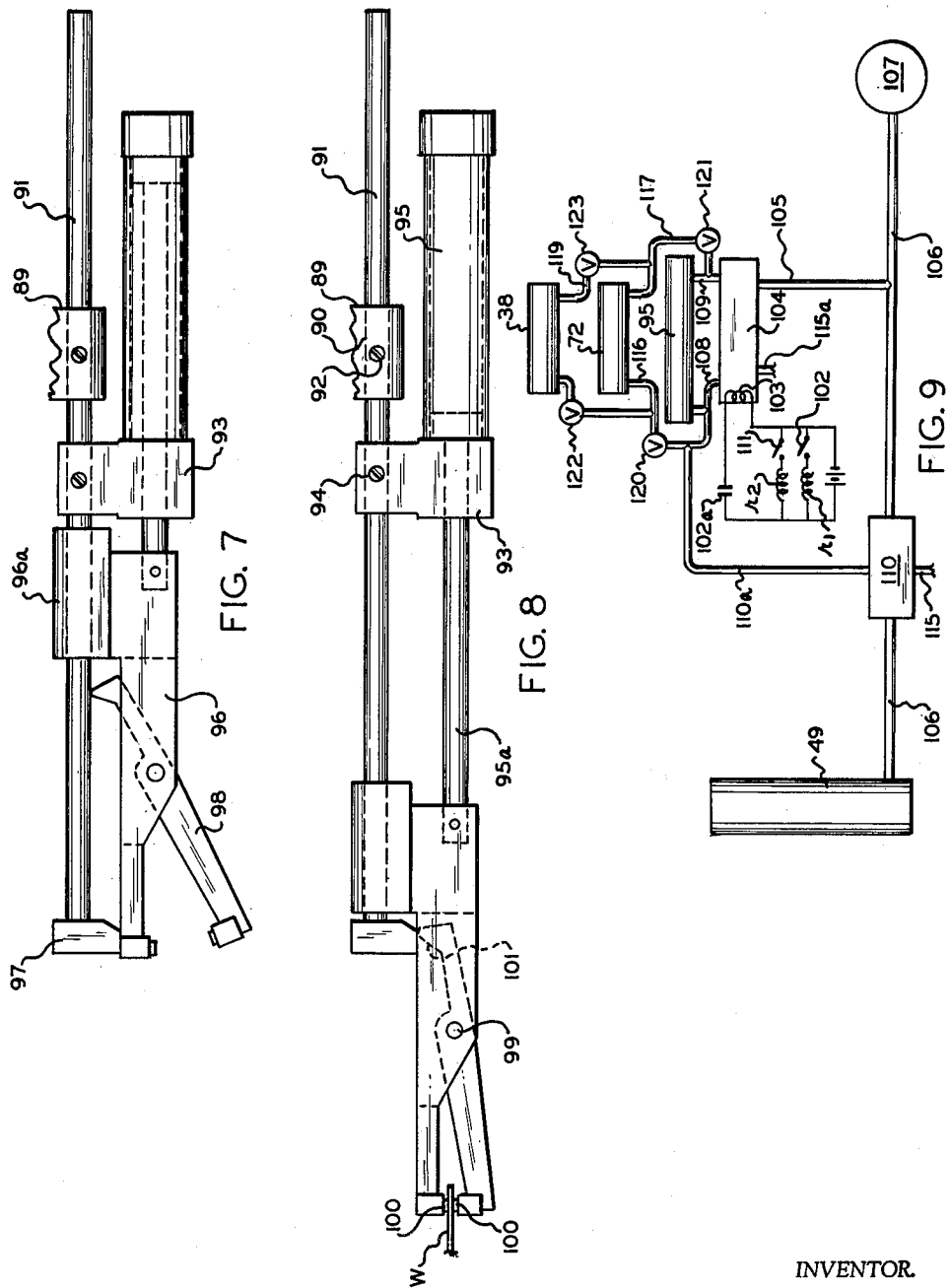

3,209,922
MATERIAL HANDLING APPARATUS
Richard H. Melvin, 208 Wabasso, Walled Lake, Mich.
Filed May 16, 1962, Ser. No. 195,133
6 Claims. (Cl. 214—1)

This invention relates to material handling apparatus and more particularly to work removing mechanism of the iron hand type for unloading workpieces such as stampings from a press or like machine. It is a principal object of the present invention to design an improved iron hand type unloader which avoids the use of the cams and cam tracks employed by conventional mechanisms and is uniquely moved in a manner to follow a path providing a more versatile unloading operation.

Another important object of the invention is to provide unloading mechanism which is selectively capable of moving in varied arcs of travel in to and out away from the dies being unloaded to permit accomplishment of a wide variety of unloading operations.

Another object of the invention is to design an unloading machine providing an arc of much greater length than the arc obtained with unloaders of conventional design, so that panels of increased length can be readily unloaded to conveyors or transfer machines.

Another object of the invention is to provide an unloader which at the extreme end of its stroke and in a locked "up" position provides more accessibility to the press bed area for the removing and changing of dies.

Another object of the invention is to provide a machine having an unloading arc of travel characterized by a greater lift at the unloading location, which permits rear die gauges to be higher to facilitate accurate loading of the blanks, while still permitting an automatic unloading operation.

A further object of the invention is to provide mechanism capable of providing an arc of travel in which the panel or workpiece is moved relatively higher at a steeper angle during the terminal portion of the unloading arc of travel, so that the workpieces automatically turn over when released and turnover mechanism is not required for medium and even large size panels.

Another object of the invention is to provide a machine which can perform a range of unloading work now necessitating two different sizes of machines, and which includes a pendant arm quadrant structure which can be moved to various laterally adjusted positions.

Another object of the invention is to provide mechanism of the character described which can be designed to unload machines such as 150-ton gap-type presses wherein ejector cylinders requiring expensive machining of the dies are now employed.

Another object of the invention is to provide a machine of the character described which, as noted, does not require cam tracks and accordingly is much more readily maintained than those in present use in industry.

A further object of the invention is to provide an unloader which can unload from the center line of a press without the panel or workpiece dipping below the pick-up point. This avoids the necessity of providing dies of considerable height to prevent the workpieces from being damaged by striking the bolster plate in the unloading operation and permits the dies to be moved closer to the front of the press, thus enabling operator loading of the die with greater safety.

A further object of the invention is to provide a machine which provides greater jaw rigidity at the rest position of the cycle.

Other objects and advantages of the invention will be pointed out specifically or will become apparent from the following description when it is considered in conjunction with the appended claims and the accompanying drawings, in which:

FIGURE 2 is an end elevational view of the mechanism only;

FIGURE 5 is an enlarged, sectional plan view taken on the line 5—5 of FIGURE 1;

FIGURE 6 is an enlarged side elevational view illustrating the dashpot device for damping the return travel of the mechanism;

FIGURE 7 is an enlarged, fragmentary, side elevational view showing the jaws of the iron hand in retracted position;

FIGURE 8 is a similar view showing the jaws in extended position gripping a workpiece;

FIGURE 9 is a typical electrical control system which may be employed;

FIGURE 10 is a fragmentary, side elevational view showing an alternate form of adjustment for one of the link fulcrum points;

FIGURE 11 is a fragmentary side elevational view illustrating an alternate manner of mounting the link pivot pins so that they are manually adjustable;

Figures 1, 12, 13:
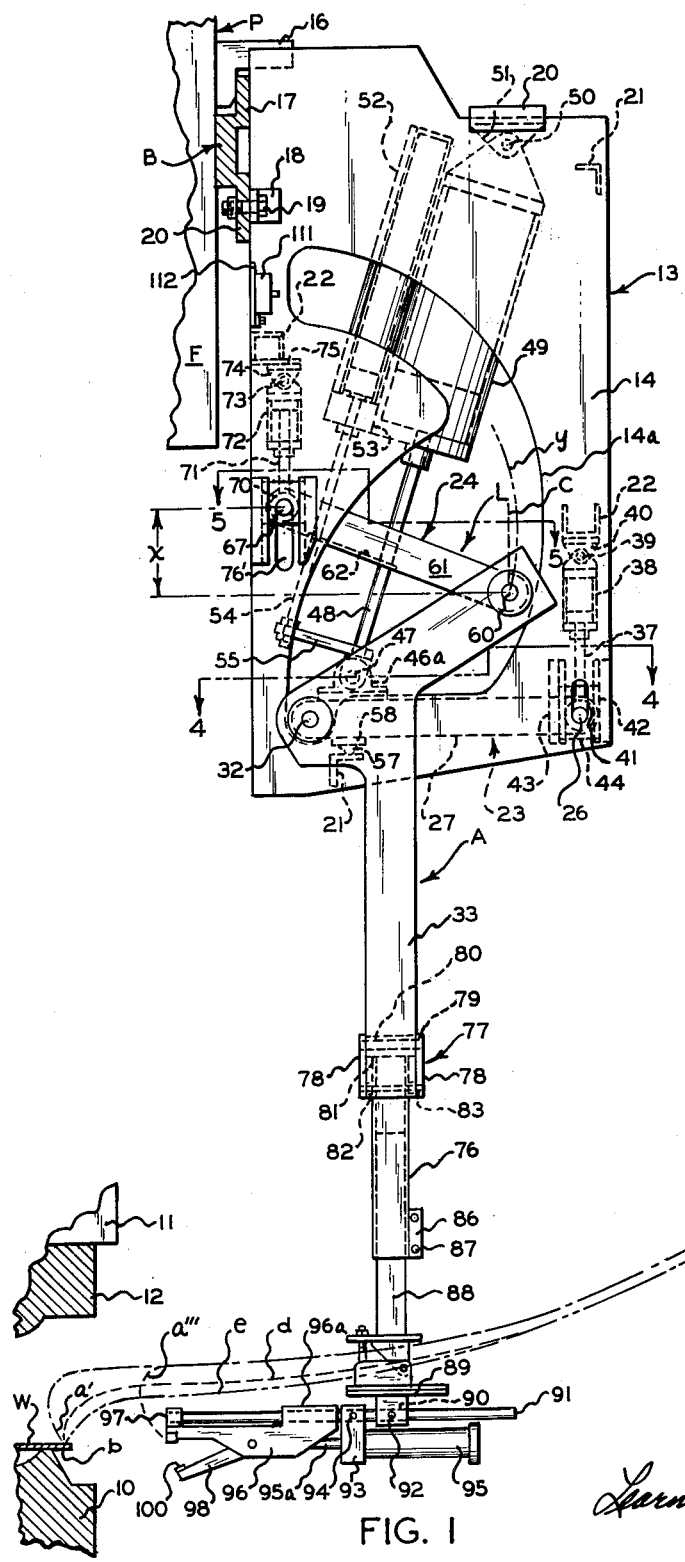
FIGURE 1 is a side elevational view showing the transporting mechanism mounted in position on a press, the pendant arm being shown in rest position and the chain lines indicating various unloading paths of travel of the anterior portion of the iron hand.
FIGURE 12 is a side elevational view depicting a modified manner of mounting the structure.
FIGURE 13 is a plan view.

Briefly, the invention includes support means adapted to be mounted on or at a side of a stamping machine or the like above the die area, pendant arm means, swingable in to and out from the work area, and having work grippers or iron hand means at its lower end actuatable automatically to grip and release the workpiece at the opposite ends of the arc of travel of the pendant arm means, and mechanism for moving the pendant arm means in the arc of travel described.

Referring now more particularly to the accompanying drawings, in which a preferred embodiment of the invention only is shown, a letter P generally illustrates a press of any well known or conventional type, such as a stamping press, having a bed or base carrying a fixed lower die 10. The press also includes the usual vertically reciprocable ram 11 carrying a punch or die 12 which is cooperable with the bottom die 10 for the purpose of stamping out or drawing a workpiece W comprising a stamping or panel from a sheet metal blank or the like.

Rigidly fixed to a bracket B mounted fast on the upper part of the frame F of the press in any acceptable manner is an unloader support structure generally designated 13 which includes outwardly extending, transversely spaced side plates 14 and 15 having hook members 16 at their upper inner corners adapted to hook over a rail 17 on the bracket B. The side frame members 14 and 15 also include angle brackets 18 which can be bolted as with bolts 19 to a lower rail 20 on the bracket frame B. At their upper ends the plates 14 and 15 are connected by a cross bar 20 and in addition various cross braces 21 and 22 may be provided to rigidify the frame 13.

Figure 4:
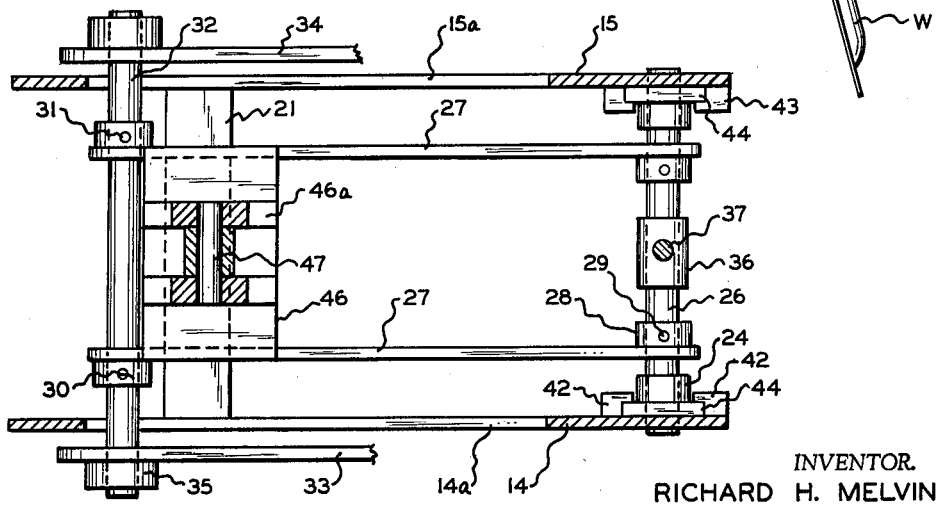
FIGURE 4 is an enlarged, sectional plan view taken on the line 4—4 of FIGURE 1.

Supported by the frame 13 in a manner to carry a pendant iron hand carrying arm assembly generally designated A through a predetermined unloading and return arc of travel $a$ is a link mechanism L which includes a main link assembly generally designated 23 and an upper, secondary link assembly generally designated 24. It will be seen that bearings 25 on the side plates 14 and 15 journal a shaft 26 (FIGURES 1 and 4) on which the main link assembly 23 is mounted, the main link assembly including spaced apart link or lever members 27 having hubs 28 which may be pinned to the shaft 26 as at 29. At their opposite ends the lever members 27 have hubs 30 which are pinned as at 31 to a shaft 32 which extends out the slotted openings 14a and 15a cut in the side plates 14 and 15 to reduce the weight thereof while at the same time providing freedom of travel for the shaft 32 in a manner which will be presently apparent. The pendant arm assembly A includes transversely spaced apart members 33 and 34 (FIGURES 2 and 4) having integrated bearings 35 which journal the shaft 32.

Pivotally mounted on shaft 26 is a ring member 36 which is fixed to the piston rod 37 of a suitable raising and lowering member such as a fluid pressure actuated cylinder 38, the cylinder 38 being pinned as at 39 to ears 40 fixed on one of the brace members 22. Vertically elongated slots 41 provided in side plates 14 and 15 permit vertical movement of shaft 26, and ways 42 and 43 may be provided on the inner surfaces of plates 14 and 15, respectively, to receive blocks 44 which journal the shaft 26 and assure accurate positioning thereof. In this way the shaft 26 may be moved upwardly or downwardly, if desired, in a manner which will be described to change the arc of travel of the arm assembly A. The levers 27 are rigidly connected at their inner ends by a plate 46 mounting bearing plates 46a which are connected by means of a pivot pin 47 with the piston rod 48 of a single acting, gravity returned, pressure fluid actuated cylinder 49, the cylinder 49 being pivotally connected at 50 to ears 51 on the plate 20. A dashpot oil cylinder 52 of conventional design may be fixed to the cylinder 49 at 53 and may include a piston rod 54 connected to the piston rod 48 by means of a strap 55. Piston rod 54 (FIGURES 6) mounts a piston 54a having oil ports 54b and axially slideable on a reduced portion 54c of the rod 54 is an enlarged seal 54d. When piston 54a is returning with piston rod 48 and meets the oil in reservoir cylinder 52 it is moved upwardly to seal ports 54b. Oil is then forced through passage 54e which is restricted as at 56 to dampen and cushion the movement of piston 54a.

Figure 3:
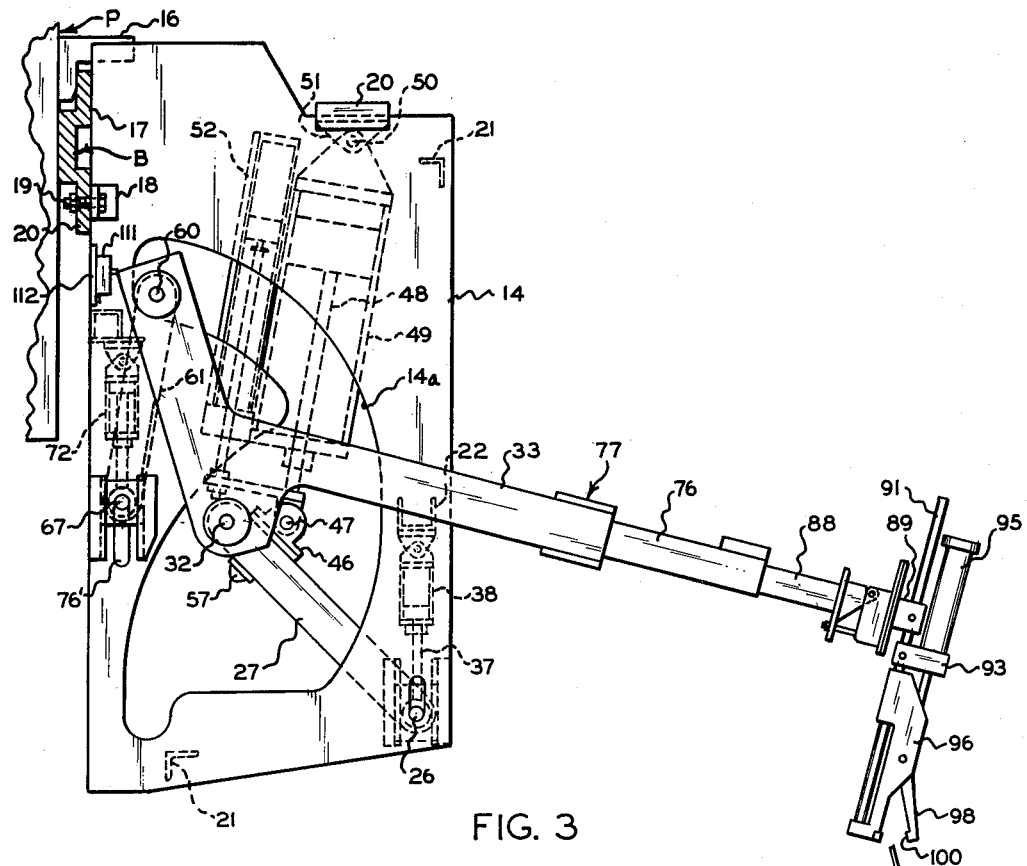
FIGURE 3 is a side elevational view similar to FIGURE 1, with the pendant arm means in raised outer position, showing the iron hand in the act of releasing the workpiece.

The cross brace 21 near the lower inner corner is positioned to be engaged by a rubber bumper stop 57, as shown in FIGURE 1, which is carried by a bar 58 spanning the lever members 27. Once the workpiece is gripped and the conventional air cylinder 49 is energized to withdraw the piston rod 48 from the position in which it is shown in FIGURE 1 toward the position in which it is shown in FIGURE 3, the shaft 32 is swung upwardly about the shaft 26 as an axis or fulcrum to swing the arm assembly A upwardly.

In order to provide the arc of travel $a$ which includes an inward and upward movement from the pick-up point $b$, a relatively long withdrawal path, and a relatively steep ascent to the workpiece discharge point, the secondary link assembly 24 is also connected with the arm plates 33 and 34. Provided on plates 33 and 34 are bearings 59 (FIGURE 5) which journal stub shafts 60 as shown. A pair of link or lever members 61 braced by connecting plate 62 include hubs 63 which can be pinned to the shaft 60 as at 64. At their opposite ends the lever members 61 have hubs 65 which are pinned as at 66 to a shaft 67 journaled by bearings 68 provided on the side plates 14 and 15. The arc of the arm assembly A is directly affected by the secondary lever assembly 24 and particularly by the relative vertical positions of the shafts 67 and 60, as will later appear. A bearing 70 pivotally mounted on shafts 67 is fixed to the piston rod 71 of a suitable pressure fluid cylinder 72 or the like which is pivotally connected as at 73 to ears 74 on a plate 75 mounted on a cross-brace 22. The plates 14 and 15 include slotted openings 76' passing the shaft 67 which, like the shaft 26, may be adjusted vertically to vary the arc of travel of the arm assembly A. Also, similar ways or tracks 42 and 43 may be provided for blocks 44 which journal the shaft 67 in the same manner that shaft 26 is journaled.

Mounted on the lower ends of the arm plates 33 and 34 of arm assembly A is a socket tube 76 carried by a quadrant box assembly generally designated 77 which includes side plates 78 spanning the plates 33 and 34. Each of the plates 78 includes an opening 79 for a pin 80 by means of which a socket portion 81 on the upper end of the quadrant tube 76 is pivotally mounted. The tube 76 also includes threaded bores 82 for receiving a screw 83, the screw 83 passing through any one of a number of arcuately arranged openings 84 to secure the tube 76 in any one of a number of angular positions relative to the arm plates 33 and 34. At its lower end the quadrant tube 76 may be split as at 85 and provided with clamp plates 86 which can be clamped by screws 87 to secure a lower tube 88 in vertically adjusted position.

Mounted on the lower end of the member 88 is a hanger member 89 having an opening 90 therein receiving a support bar 91 and, as shown in FIGURE 1, a set screw member 92 may be employed to adjust and then secure the support bar 91 of the iron hand in fixed position. Supported by the bar 91 from a cylinder head hanger strap 93, adjustably secured as by a set screw 94, is a pneumatic cylinder 95 having a piston rod 95a which mounts a non-pivotal jaw housing 96, the jaw housing 96 including socket portion 96a which is slideably received on the support bar 91. The support bar 91 also mounts a striker plate 97 which is fixed in position on the inner end thereof, and a pivotal lower jaw 98 is pivotally mounted at 99 by the upper jaw 96. Wear resistant insert members 100 are provided on both the fixed and movable jaws 96 and 98, respectively, and it will be seen that the movable jaw 98 includes a projecting cam portion 101 (FIGURES 7 and 8) which, when it meets striker plate 97 in its forward travel, pivots the jaw 98 upwardly to grip the workpiece in association with the fixed jaw 96. This occurs in the usual manner at the terminal portion of the inward stroke of the iron hand jaws 96 and 98 which are moved by the cylinder 95.

In FIGURE 9 a typical electrical control system is shown. A suitable limit switch 102 mounted on the press in the usual manner, as in Patent No. 2,609,776 to Sahlin, granted September 9, 1952, may be actuated by a cam after ram 11 has on its upward stroke moved die or punch 12 a predetermined distance, such as 6 inches, upwardly away from the lower die 10. At this time the pendent arm A and gripping jaws 96, 98 will be at the rest position, as shown in FIGURE 1. The normally open limit switch 102, when closed by the cam, will energize the latching coil $r_1$ of a mechanical latching relay R and close the normally open contacts 102a of the relay R to energize the solenoid 103 of a spring returned Clark 4-way solenoid operated air valve which reverses the flow of and discharge of air to the iron hand operating cylinder 95. Conventional relay R includes a latching coil $r_1$ and a releasing coil $r_2$. It will be seen that the 4-way valve 104 is connected by an air line 105 with a line 106 leading from a suitable source of air under pressure 107 such as standard compressor connected with an accumulator tank for delivering a relatively constant pressure air supply. The lines leading from valve 104 to the opposite ends of cylinder 95 are identified by numerals 108 and 109. It will also be seen that air supply line 106 leads to pnuematic cylinder 49 through a normally closed, spring returned Ross 3-way valve 110. An air line 110a connects valve 110 with line 108. A normally open limit switch 111 mounted by frame plate 14 in any suitable manner is engaged by arm 33 at the top of its stroke and, as shown, is in series with the relay release coil $r_2$, the limit switch 111, when closed by arm 33, energizing the release coil $r_2$ of relay R and unlatching contacts 102a so that solenoid 103 is deenergized.

In operation, to obtain the highly desirable arc of travel a, which includes the upwardly and initially inwardly directed portion a', and the relatively steep release outer portion a", the cylinders 72 and 38 are inactive and hold the shafts 26 and 67 in the vertical position in which they are shown in FIGURE 1. It will be assumed that the arm assembly A is in the rest position in which it is shown in FIGURE 1 and that a stamping operation has just been completed.

As the ram 11 raises the die 12 away from the workpiece W, the normally open, cam actuated limit switch 102 is closed, holding relay contacts 102a are latched, and solenoid 103 is energized to move the pilot of the 4-way valve 104 in a direction to supply air under pressure through the line 108 and exhaust it through the line 109 and valve 104 to the exhaust line 115a leading from the 4-way valve which leads to atmosphere. With this the fixed and pivotal jaws 96 and 98 move inwardly and the workpiece W is gripped when the pivotal jaw 98 is pivoted upwardly upon the engagement of the cam portion 101 with the striker plate 97. It will be seen that air from line 108 also is supplied to the pressure operated 3-way valve 110 and actuates the pilot therein to open the line 106 to the main cylinder 49. This causes the retraction of the piston rod 48 and accompanying piston rod 54 of the dashpot cylinder 52.

It will be noted that the pressure pad 100 of jaw 96, whose arc is described at a, would move upwardly and outwardly with pivotal movement of the main arm assembly 23 only, the initial upward movement of the pivot shaft 60 taking approximately the vertical path of travel indicated by line c. Because the pivot shaft 67 of the upper arm assembly is vertically spaced above the pivot shaft 60 (the distance x), the actual travel of the pivot shaft 60 in the initial portion of the stroke is described by the arc y, which has the important effect of moving the iron hand inwardly as well as upwardly in the initial portion of the stroke, rather than outwardly and upwardly. The arrangement further provides for a relatively long and flat stroke in the extended intermediate portion of the arc, which is much longer than arcs possible with conventional cam operated unloading mechanisms, and because the upper arm assembly 24 swings upwardly to a position in which the pivot shaft 60 is substantially above the shaft 67, the terminal portion of the arc a is relatively steep. In this manner all obtacles are easily cleared and the relatively steep terminal ascent of the iron hand causes the workpiece to turn over at the time of release.

Near the top of the stroke the arm 33 engages the limit switch 111, which is mounted for vertical adjustment in a slot 113 on a slide plate 112, the switch 111 being secured in vertically adjusted position by a bolt and wing nut assembly 114. When the normally open limit switch 111 is closed, the relay coil $r_2$ is energized to unlatch contacts 102a and the circuit to solenoid 103 is opened and solenoid 103 is deenergized. A return spring in 4-way valve 104 returns the pilot therein and the air source through line 105 is communicated with the line 109, whereas line 108 is communicated with the exhaust line 115a of valve 104. With the piston in cylinder 95 returning sharply, the pivotal jaw 98 releases the workpiece W which, because of the relatively steep ascent at the terminal portion of the arc, releases the workpiece at an angle such that it turns over or inverts. The workpiece W falls to a take-away conveyor (not shown) in the usual manner.

When the supply of pressure fluid through the air cylinder 95 is reversed by the limit switch 111 to communicate line 108 with the exhaust portion of 4-way valve 104, the pressure in line 110a is relieved and the return spring in 3-way valve 110 returns the pilot therein to again close the normally closed 3-way valve 110. This has the effect of communicating the portion of the line 106 between the cylinder 49 and 3-way valve 110 with the exhaust line 115 of the 3-way valve 110 and the piston in cylinder 49 is free to descend by gravity. As previously explained, the damping cylinder 52 serves to cushion the return of the arm assembly A to the position shown in FIGURE 1. On the return stroke the insert 100 on the fixed jaw 96 of the iron hand returns in an arc a''' to the rest position. The electrical-pneumatic control system schematically illustrated and described is only one of several systems which could be employed and the present system is disclosed only for convenience sake as typical.

It has been determined that the unloader disclosed permits an arc approximately 57% greater in length than now used in industry and an initial lift of the workpiece at the work gripping point approximately 88% greater than that provided by machines now in industry. The height to which a panel can be lifted prior to its release is at least 100% greater with this machine than with other machines now in use. In an instance where the initial high lift of the iron hand mechanism is deemed unnecessary, the upper link assembly 24 may be eliminated.

The machine is interchangeable with and can be attached to press mounting brackets B presently in use and conventional latching mechanism can be readily used to latch the arm assembly A in the up position in which it is shown in FIGURE 3. Because the arm plates 33 and 34 are located outside the side plates 14 and 15, a box type design is provided, which results in greater machine rigidity. Also, in view of the adjustability of the iron hand mechanism vertically and angularly, the unloader can be used in various situations where panel pick-up heights vary considerably. While an air cylinder 49 is shown for moving the arm assembly A through its path of travel, it is clear that other motor means may be employed.

FIGURE 9 further includes branch lines 116 and 117 leading to opposite ends of the air cylinder 72 and branch lines 118 and 119 leading to opposite ends of the air cylinder 38. Provided in lines 116–119 are conventional manually or automatically operable shut-off valves 120–123, respectively, which permit discommunication of the cylinders 72 and 38 when desired. Obviously, the arc of travel is affected by displacement of the pivot shafts 67 and 26. If shut-off valves 120 and 121 are open, for example, while valves 122 and 123 remain closed, the piston in cylinder 72 is moved to lower the shaft 67 during the unloading stroke and a flatter arc, such as shown at d, results, the distance x being substantially decreased. It may be desired to employ the arc d, for instance, when the dies are necessarily so configured that the more desirable initial inward and upward movement a' cannot be used. When the shut-off valves 122 and 123 are also opened and the piston in cylinder 38 raises the pivot shaft 26, an even flatter arc, such as shown at e, can be provided. It should be apparent that with the present construction the arc of travel of the iron hand can be readily varied to suit the particular unloading operation. With conventional, cam operated unloading arm mechanisms, each machine is in practice designed for one unloading arc only.

In FIGURE 10 an alternate form of construction is shown in which the shaft 26, instead of being supported from a vertical cylinder 38, is connected to the piston rod 37′ of a horizontal double-acting cylinder 38′ which is mounted to move the shaft 26 horizontally within the confines of slots 41′ in the side members 14 and 15. The cylinder 38′ may be pivotally mounted as at 39′ to a bracket 40′ lying between the links 27 so as not to interfere with the movement thereof, the bracket 40′ being supported by a cross bar 22′ which spans the plates 14 and 15 below the lowermost position of links 27. It will be seen that primed numerals have been used to designate parts which are similar to the parts shown in FIGURE 1. If the shaft 26 is moved to the left (in FIGURE 10 the double-acting cylinder 38′ may be inserted in place of the cylinder 38 in FIGURE 9), the length of the lever arms 27 are, in effect, shortened and the arc of travel of the arm assembly A is changed. While I have indicated that the cylinder 38′ could replace the cylinder 38 in FIGURE 10, plainly both cylinders could be attached to the shaft 26 and in the control system they could be placed in parallel, so that either one or the other could be operated as desired.

In FIGURE 11 I have shown a manually adjustable mount for the cylinders 38 or 72 or which could be employed to move the shafts 26 and 67. In this embodiment of the invention the bearing 70 on shaft 67 may be welded directly to a threaded stud member 124 which is extended through a cross support 22 and secured by lock nuts 124a as shown. It is to be understood that the shaft 26 could be mounted in the same manner for adjustment either in a vertical or a horizontal direction.

In FIGURE 12 an alternate method of mounting the support structure 13 on the press is disclosed. Upper and lower rails 17 and 20 are provided spaced in front of the press as previously and the hook member 16 hooks over the upper rail 17 in the same manner. In this embodiment of the invention a pair of transversely spaced hooks 125 are provided which hook over the lower rail 20. A pair of transversely spaced side bars 126 provided under the pair of hooks 125 are threaded as at 127 to receive bolt members 128 which, once the hooks 16 and 125 are hooked over rails 17 and 20, can be adjusted upwardly into engagement with the rail 20. This provides a positive lock and eliminates the need of centering the machine exactly on the rail 17 as in the previous embodiment. The rails 17 and 20 are not supported by a bracket B but may be supported by strut members 129 extending from the ends of the rails 17 and 20 and secured to the press.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:
1. Work unloading means for a power press comprising: frame means; an arm rockably suspended from said frame means generally vertically adjacent said press and swingable in an arc out away from the press, said arm having an upper end portion extending outwardly when the arm is adjacent the press; work gripping means on the lower end of the arm for gripping a workpiece in said press; first lever means, pivotally connected with the upper end of said arm at a first connection, supported by said frame means for pivotal movement about a generally horizontal axis situated outwardly of the said first connection in all operative positions of said first lever means; second lever means, pivotally connected to the outer end of the outwardly extending portion of the arm at a point outwardly spaced from the said first connection when the arm is adjacent the press, at a second connection pivotally connected to said frame means for movement about a generally horizontal axis situated inwardly of the connection to the arm when the arm is adjacent the press; fluid pressure cylinder motor means connected to swing said first lever means upwardly and outwardly through an arc less than ninety degress to remove a workpiece gripped by said work gripping means from the vicinity of the press and travel it upwardly and outwardly through an arc to a release point; and means operating said work gripping means to grasp a workpiece when the arm is adjacent the press and to release it when the arm has been swung outwardly to the release point.

2. The combination defined in claim 1 in which one of said connections is mounted on fluid pressure cylinder means and is moved thereby when said fluid pressure cylinder motor means is operated to swing said arm outwardly.

3. Work unloading means for a power press comprising: frame means; an arm rockably mounted by said frame means generally vertically adjacent said press and swingable in an arc out away from the press; work gripping means on the lower end of the arm for gripping a workpiece in said press; first lever means, pivotally connected with the upper end of said arm at a first connection, supported by said frame means for pivotal movement about a generally horizontal axis situated outwardly of the said first connection in all operative positions of said first lever means; second lever means, pivotally connected to the upper end of the arm at a point outwardly spaced from the said first connection when the arm is adjacent the press, at a second connection pivotally connected to said frame means for movement about a generally horizontal axis situated inwardly of said second connection when the arm is adjacent the press; and motor means connected to swing said first lever means upwardly and outwardly to remove a workpiece gripped by said work gripping means from the vicinity of the press and travel it upwardly and outwardly through an arc to a release point; and means operating said work gripping means to grasp a workpiece when the arm is adjacent the press and to release it when the arm has been swung outwardly to the release point.

4. Work handling means for a power press comprising: frame means; an arm rockably suspended from said frame means generally vertically adjacent said press and swingable in an arc out away from the press; work gripping means on the lower end of the arm for gripping a workpiece in said press; lever means, pivotally connected with the upper end of said arm at a first connection; pivot means supporting said lever means on said frame means for pivotal movement about a generally horizontal axis situated outwardly of said first connection; fluid pressure cylinder motor means connected to swing said lever means upwardly and outwardly to remove a workpiece gripped by said work gripping means from the vicinity of the press and travel it upwardly and outwardly through an arc to a release point; and means for moving said pivot means to a different position to vary the curvature of the arc of travel of said arm while said fluid pressure cylinder motor means is swinging said lever means upwardly and outwardly.

5. Work handling means for a power press comprising: frame means; an arm rockably suspended from said frame means generally vertically adjacent said press and swingable in an arc out away from the press; work gripping means on the lower end of the arm for gripping a workpiece in said press; lever means, pivotally connected with the arm at a pivot connection, supported by said frame means for pivotal movement about a generally horizontal axis; means connected to swing said first lever means upwardly and outwardly through an arc to remove a workpiece gripped by said work gripping means from the vicinity of the press and travel it upwardly and outwardly through an arc to a release point; and means mounting said pivot connection for movement to different positions providing different curvatures for the arcs of travel for said arm.

6. The combination defined in claim 5 in which slot means is provided in said frame means and said pivot connection comprises pivot shaft means supported in said slot means.

References Cited by the Examiner
UNITED STATES PATENTS

| | | | |
|---|---|---|---|
| 549,049 | 10/95 | Batty | 248—223 |
| 2,144,602 | 1/39 | Balmer | 248—223 |
| 2,609,776 | 9/52 | Sahlin. | |
| 2,677,342 | 5/54 | Miller. | |
| 2,943,748 | 7/60 | Sahlin. | |
| 3,040,685 | 6/62 | Ridley. | |
| 3,061,118 | 10/62 | Halberstadt. | |

HUGO O. SCHULZ, *Primary Examiner.*